United States Patent
Elinas et al.

(10) Patent No.: US 9,129,236 B2
(45) Date of Patent: Sep. 8, 2015

(54) DRILL HOLE PLANNING

(75) Inventors: Pantelis Elinas, Glebe (AU); Surya P. N. Singh, Burwood (AU)

(73) Assignee: The University of Sydney, New South Wales (AU)

( * ) Notice: Subject to any disclaimer, the term of this patent is extended or adjusted under 35 U.S.C. 154(b) by 559 days.

(21) Appl. No.: 13/264,740

(22) PCT Filed: Apr. 16, 2010

(86) PCT No.: PCT/AU2010/000422
§ 371 (c)(1),
(2), (4) Date: Oct. 14, 2011

(87) PCT Pub. No.: WO2010/118470
PCT Pub. Date: Oct. 21, 2010

(65) Prior Publication Data
US 2012/0024605 A1    Feb. 2, 2012

(30) Foreign Application Priority Data

Apr. 17, 2009   (AU) .............................. 2009901656

(51) Int. Cl.
*E21B 3/06*      (2006.01)
*G06Q 10/06*    (2012.01)
*E21B 44/00*    (2006.01)

(52) U.S. Cl.
CPC ................ *G06Q 10/06* (2013.01); *E21B 44/00* (2013.01)

(58) Field of Classification Search
None
See application file for complete search history.

(56) References Cited

U.S. PATENT DOCUMENTS

| | | | | |
|---|---|---|---|---|
| 3,721,471 | A * | 3/1973 | Bergmann et al. | 299/55 |
| 3,877,373 | A * | 4/1975 | Bergmann et al. | 102/312 |
| 3,896,885 | A * | 7/1975 | Dahlstrom et al. | 173/2 |
| 4,113,033 | A * | 9/1978 | Lindblad | 173/1 |
| 4,230,189 | A * | 10/1980 | Mashimo | 173/4 |
| 4,501,199 | A * | 2/1985 | Mashimo et al. | 102/313 |
| 4,639,868 | A * | 1/1987 | Tanaka et al. | 702/9 |
| 5,200,677 | A * | 4/1993 | Dueck et al. | 318/567 |
| 5,533,841 | A * | 7/1996 | Iwano et al. | 408/1 R |
| 5,805,452 | A * | 9/1998 | Anthony et al. | 700/142 |
| 5,913,199 | A | 6/1999 | Dueck et al. | |
| 6,495,791 | B2 * | 12/2002 | Hunter et al. | 219/121.6 |
| 6,772,105 | B1 * | 8/2004 | Heck, Sr. | 703/10 |
| 6,792,363 | B1 * | 9/2004 | Bye | 702/57 |
| 6,957,707 | B2 * | 10/2005 | Koivunen et al. | 175/27 |

(Continued)

FOREIGN PATENT DOCUMENTS

WO    WO 2009/109007    9/2009

OTHER PUBLICATIONS

Le Ny, Jerome. Performance optimization for unmanned vehicle systems. Diss. Massachusetts Institute of Technology, 2008.*

(Continued)

*Primary Examiner* — Gurkanwaljit Singh
(74) *Attorney, Agent, or Firm* — Blakely, Sokoloff, Taylor & Zafman LLP

(57) ABSTRACT

Forming a sequence plan for a machine to travel to a series of specified locations is described. An initial cost table (414) and a pattern of locations (412) is inputted to a Sequential Ordering Problem (SOP) solver (402). The resulting sequence (410) is processed by a motion planner (404) to derive by a motion planning procedure a plan of machine motions through the sequence. A cost table update (408) is performed based on the motion plan, which is then used for another iteration of the SOP solver (402).

29 Claims, 8 Drawing Sheets

(56) References Cited

U.S. PATENT DOCUMENTS

| | | | |
|---|---|---|---|
| 7,267,182 B2* | 9/2007 | Saha | 173/2 |
| 7,289,871 B2* | 10/2007 | Williams | 700/160 |
| 7,681,660 B2* | 3/2010 | Muona | 173/4 |
| 8,214,073 B2* | 7/2012 | Keskinen | 700/182 |
| 8,244,469 B2* | 8/2012 | Cheung et al. | 701/519 |
| 8,297,377 B2* | 10/2012 | Zupanick | 175/61 |
| 8,315,838 B2* | 11/2012 | Durrant-Whyte et al. | 703/1 |
| 8,392,014 B2* | 3/2013 | Saleniemi et al. | 700/182 |
| 2004/0108110 A1* | 6/2004 | Zupanick | 166/245 |
| 2004/0216922 A1* | 11/2004 | Koivunen et al. | 175/24 |
| 2004/0252288 A1 | 12/2004 | Kacyra et al. | |
| 2005/0010385 A1* | 1/2005 | Heck, Sr. | 703/10 |
| 2005/0283294 A1 | 12/2005 | Lehman, Jr. et al. | |
| 2006/0124360 A1* | 6/2006 | Lee et al. | 175/61 |
| 2007/0046448 A1 | 3/2007 | Smitherman et al. | |
| 2007/0179685 A1* | 8/2007 | Milam et al. | 701/3 |
| 2007/0294029 A1* | 12/2007 | D'Andrea et al. | 701/204 |
| 2009/0053004 A1* | 2/2009 | Yamaura et al. | 409/165 |
| 2009/0196699 A1* | 8/2009 | Elfizy | 408/1 R |
| 2009/0240481 A1* | 9/2009 | Durrant-Whyte et al. | 703/7 |
| 2010/0017046 A1* | 1/2010 | Cheung et al. | 701/2 |
| 2010/0044107 A1* | 2/2010 | Keskinen | 175/24 |
| 2012/0046983 A1* | 2/2012 | Nettleton et al. | 705/7.12 |
| 2012/0103598 A1* | 5/2012 | Nadeau et al. | 166/245 |

OTHER PUBLICATIONS

Dowd, P. A., and P. C. Dare-Bryan. "Planning, designing and optimising production using geostatistical simulation." Proceedings of the International Symposium on Orebody Modelling and Strategic Mine Planning: Uncertainty and Risk Management. Hyatt Regency, Perth. 2005.*

Ortiz, Julián M., and Xavier Emery. "Integrating Multiple Point Statistics in Sequential Simulation."*

Ortiz, Julián M., Enrique Rubio, and Juan Luis Yarmuch. "An optimization algorithm to assess different reserves models for open pit short term planning." (2007).*

J.E. Everett, Computer aids for production systems management in iron ore mining, International Journal of Production Economics, vol. 110, Issues 1-2, Oct. 2007, pp. 213-223, ISSN 0925-5273.*

Iatha Krishna Sundar, Damodar Acharya, Blast schedule planning and shiftwise production scheduling of an opencast iron ore mine, Computers & Industrial Engineering, vol. 28, Issue 4, Oct. 1995, pp. 927-935, ISSN 0360-8352.*

Sai K. Yadlapalli, et al., "A Lagrangian-Based Algorithm for a Combinatorial Motion Planning Problem," Advances in Cooperative Control and Optimization, LNCIS, vol. 369, pp. 373-387 (2007).

Pantelis Elinas, "Multi-Goal Planning for an Autonomous Blasthole Drill," Proceedings of the Nineteenth International Conference on Automated Planning and Scheduling, pp. 342-345 (2009).

Jill Cirasella, "The Asymmetric Traveling Salesman Problem: Algorithms, Instance Generators, and Tests," ALENEX 2001 Proceedings, Springer Lecture Notes in Computer Science, vol. 2153, pp. 32-59 (2001).

Olli Braysy, et al., "A Multi-Start Local Search Algorithm for the Vehicle Routing Problem with Time Windows," European Journal of Operational Research, vol. 159, Iss. 3, pp. 586-605 (2004).

Jerome Le Ny, "Performance Optimization for Unmanned Vehicle Systems," Thesis (Ph. D.)—Massachusetts Institute of Technology, Dept. of Aeronautics and Astronautics, pp. 2-5, 7-9, 11-13, 15-155 (2008).

S. Chen, "Commonality and genetic algorithms," Technical Report CMU-RI-TR-96-27, Robotics Institute, Carnegie Mellon University, Pittsburgh, PA, (Dec. 1996).16 pgs.

G. Venter, "Particle swarm optimization," AIAA Journal, pp. 1583-1589, (2002), 10 pgs.

M. Gambardella, et al., "An ant colony system hybridized with a new local search for the sequential ordinary problem," INFORMS Journal on Computing 12(3), pp. 237-255.(2000).19 pgs.

K.I. Tsianos, et al., "Sampling-based robot motion planning: Towards realistic applications," Computer Science Review, 1(1); 2-11, (2007).24 pgs.

S.M. La Valle, "Planning Algorithms," Cambridge University Press, Cambridge, U.K; (2006) 1023 pgs.

P. Cheng, et al., "RRT-based trajectory design for autonomous automobiles and space-craft," Archives of Control Sciences 11 (3-4), pp. 167-194, (2001). 27 pgs.

* cited by examiner

DRILL HOLE PLANNING

CROSS-REFERENCE TO RELATED APPLICATIONS

This patent application is a U.S. National Phase application under 35 U.S.C. §371 of International Application No. PCT/AU2010/000422, filed Apr. 16, 2010, entitled DRILL HOLE PLANNING, which claims priority to Australian patent application number 2009901656, filed Apr. 17, 2009.

FIELD OF THE INVENTION

This invention relates to dynamic sequential ordering problems. In one form the dynamic sequential ordering problems relate to drill hole sequencing for the drilling of blast holes in surface mining. The invention has particular, but not exclusive, application to drill hole planning and navigation for autonomous drills.

BACKGROUND OF THE INVENTION

There is ongoing research into methods for solving sequential ordering problems that can be formulated as variants of the Travelling Salesman (symmetric or asymmetric travel costs and with or without precedence constraints) and Steiner tree problems including their generalised versions commonly known as the Generalised TSP and group Steiner tree problems. Different proposed exact and approximate methods have had varying success in finding optimal solutions for small problems and close to optimal solutions for large problems.

Sequential Ordering Problems arise in a wide range of industries. One example is the mining industry, where an ordering problem arises in planning the movement of a drill.

Given a drilling pattern, a drill operator or autonomous drill controller must decide on the order in which to drill the holes taking into account operational constraints imposed by the drill itself along with other constraints which may include drilling guidelines and safety rules decided by the mining company.

In conventional blast hole drilling, the drill operator is given a pattern of holes that must be drilled at a particular location or bench in the pit. The pattern may include the location of the required holes and their depth. Additional information often includes the type of drill operation that should be used for each hole (i.e. rotary or percussion). Operations follow in a tram-jack-drill-jack cycle until all locations are drilled. Conventionally, the drill motion sequence is not dictated a priori and is determined by the drill operator using a set of general guidelines and priorities for various classes of holes. Briefly, these rules dictate that the first holes to be drilled are "angle holes" along the open face, which constrains the drill's orientation so as to be aligned perpendicular to this edge. This is followed by holes near free face(s) or adjacent to blasted material (i.e. a high wall or a crest). After this are batter and buffer holes, which is followed by drilling of the main rows. The drill is a non-holonomic vehicle and its overall motion is constrained to its track speeds. Drill operators also prefer to drive on straight lines because under poor visibility executing complex manoeuvres increases the chances of damaging already drilled holes. Finally, the operators select the first and last hole to drill such that the above requirements are satisfied. The last hole is chosen in a location that allows the drill easy egress away from the bench after completion of the drilling task.

Reference to any prior art in the specification is not, and should not be taken as, an acknowledgment or any form of suggestion that this prior art forms part of the common general knowledge in Australia or any other jurisdiction or that this prior art could reasonably be expected to be ascertained, understood and regarded as relevant by a person skilled in the art.

SUMMARY OF THE INVENTION

According to an aspect of the invention, there is provided a method for producing a hole drilling sequence plan for drilling blast holes with a mobile drill at locations in a drilling pattern, comprising:

determining an initial cost table of costs of drill travel between drill hole locations in said pattern;

inputting into a Sequential Ordering Problem (SOP) solver data reflecting said pattern of locations and the initial cost table to derive by a SOP solving procedure a potentially optimal drilling sequence;

inputting data reflecting the potentially optimal drilling sequence into a motion planner to derive by a motion planning procedure a plan of drill motions through the potentially optimal drilling sequence and revised costs of drill travel between drill locations resulting from that plan; and successively repeating the SOP solving and motion planning procedures by operation of the SOP solver and motion planner with successive revisions of the cost table inputted to the SOP solver reflecting the revised costs derived by motion planner.

The method may further comprise determining precedence constraints requiring that holes at certain locations in said pattern must be drilled before holes at other locations in the pattern and inputting data reflecting those precedence constraints into the SOP solver so that the SOP solver takes those precedence constraints into account when deriving the potentially optimal drilling sequence.

The method may further comprise determining a preferred drill orientation for each of said locations and inputting data reflecting the preferred drill orientations into the motion planner so that the motion planner takes that data into account when drilling the plan of drill motions.

The method may further comprise determining motion constraints to movements of the drill and inputting data reflecting the drill motion constraints into the motion planner so that the motion planner takes those motion constraints into account when generating the plan of drill motions.

The motion constraints may include an obstacle avoidance constraint.

The obstacle avoidance constraint may prevent a drill travel path which would result in travelling over an already drilled hole.

The motion constraints may also include non-holonomic motion constraints limiting the possible directions of travel of the drill.

The motion constraints may also include limits on maximum speed of motion of the drill.

The motion constraints may include limits on the rate of change of direction of motion of the drill.

The successive repetitions of the SOP solving and motion planning procedures may be continued until a predetermined termination criterion is met.

The termination criterion may be met if successive plans generated by the motion planner are the same or within a predetermined threshold of similarity.

The termination criterion may alternatively or in addition be met by completion of a predetermined number of repetitions of the SOP solving and motion planning procedures.

The SOP solver may use a genetic algorithm. Alternatively, the SOP solver may use a Swarm Intelligence algorithm, for example a Particle Swarm Optimisation algorithm. In a further alternative, the SOP solver may use an Ant Colony Optimisation algorithm.

The motion planner may use a Probabilistic Roadmap motion planning algorithm.

The invention also extends to a method of operating an autonomous drill in which the drill is caused to execute a drilling sequence derived in the above-described manner.

The invention further provides apparatus for producing a hole drilling sequence plan for drilling blast holes with a mobile drill, comprising:

a Sequential Ordering Problem (SOP) solver to receive data reflecting a pattern of locations at which holes are to be drilled and a cost table of costs of drill travel between the drill hole locations in said pattern and operable to derive by a SOP solving procedure a potential optimal drilling sequence;

a motion planner to receive data reflecting the potentially optimal sequence derived by the SOP solver and to derive by a motion planning procedure a plan of drill motions through the potentially optimal drilling sequence and revised costs of drill travel between the drill locations resulting from that plan; and a data transfer connection between the motion planner and the SOP solver to feed the revised costs to the SOP solver whereby the SOP solver and the motion planner can perform successive SOP solving and motion planning procedures with successive revisions of the cost table inputted to the SOP solver reflecting the revised costs generated by the motion planner.

The method and apparatus of the invention may employ a drilling pattern obtained from any source. The pattern may for example be prepared by a drill and blast engineer manually or with the aid of appropriate software.

Also provided is a method for producing a sequence plan for a series of specified locations in a configuration space, comprising:

inputting into a Sequential Ordering Problem (SOP) solver data reflecting said pattern of locations and an initial cost table to derive by a SOP solving procedure a potentially optimal sequence;

inputting data reflecting the potentially optimal sequence into a motion planner to derive by a motion planning procedure a plan of motion through the potentially optimal sequence.

The motion planner may evaluate a previously recorded path within the configuration space, match said path with adjacent specified locations within the potentially optimal sequence and use said previously recorded path as part of the plan of motion if there is a match.

As used herein, except where the context requires otherwise, the term "comprise" and variations of the term, such as "comprising", "comprises" and "comprised", are not intended to exclude further additives, components, integers or steps.

BRIEF DESCRIPTION OF THE DRAWINGS

In order that the invention may be more fully explained, specific embodiments will be described with reference to the accompanying drawings in which.

DETAILED DESCRIPTION OF THE EMBODIMENTS

Figure 1:
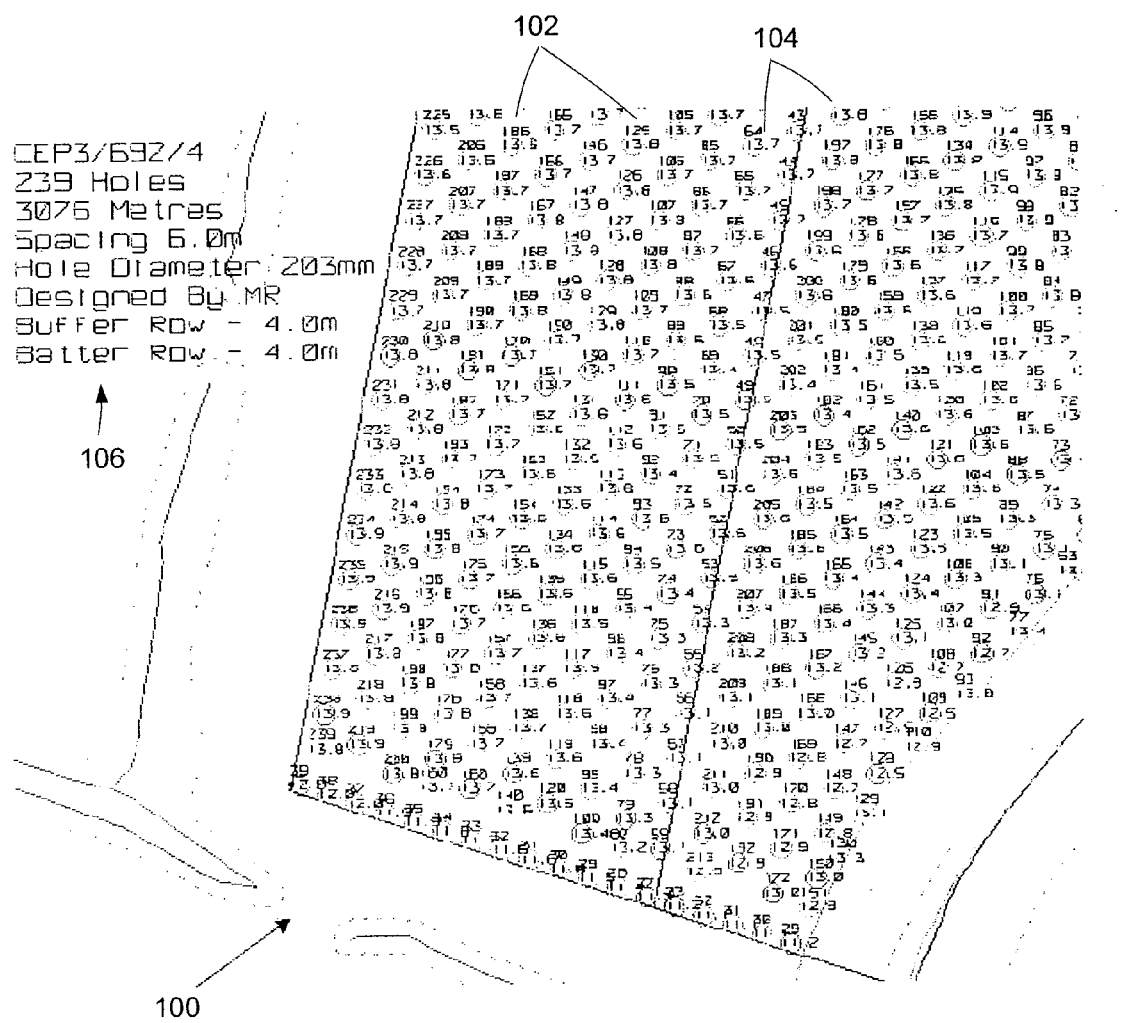
FIG. 1 shows an example of a drilling pattern.

The method and system described herein enable a solution to be derived to an ordering problem. The method and system are described herein with specific reference to the formation of a hole-drilling sequence plan to be derived automatically from certain input data. In one application this enables drill hole planning and navigation for an autonomous drill.

The pattern drilling problem belongs to a class of combinatorial optimisation problems which may be hard to solve. Combinatorial optimisation is used in applications such as artificial intelligence, operations research, planning and logistics where certain values need to be optimised within the constraints of a given problem. One example of a combinatorial optimisation problem is the generalised Travelling Salesman Problem (TSP) which can be defined as follows:

Given a set of cities along with the cost of travel between each pair of them, the travelling salesman problem is to find the cheapest way of visiting all the cities and returning to the starting point. The "way of visiting all the cities" is simply the order in which the cities are visited; the ordering is called a tour or circuit through the cities.

Drill hole planning in mining can be thought of as a Travelling Salesman Problem if each hole is regarded as a "city". In this case, the cost for travelling from one city to the next can be defined as a function of the distance to be travelled or some other metric that considers the overall motion the vehicle must perform.

The "cheapest way" is determined by optimising (minimising in this case), the cost associated with the circuit. The term "cost" as used hereinafter in this specification (including the claims) extends to any metric used to define the optimisation to be performed. In drill hole planning the cost may be dependent on a distance to be travelled by a drill and/or a motion the drill must perform. The cost may be dependent on travel path length, travel time, operation time, fuel/water usage or any combination of such variables.

Drill hole planning differs from the basic Travelling Salesman Problem. First, drill hole planning is an asymmetric Travelling Salesman Problem because the cost of going from hole A to hole B can be significantly different to the cost of going from hole B to hole A; the vehicle's motion may be highly constrained in one of the directions. Second, there are some rules specifying that certain holes must be drilled before others. As an example, precedence should be given to holes near a high wall or a crest.

The generalisation of the Travelling Salesman Problem to handle asymmetric costs and precedence constraints leads to what is known as a Sequential Ordering Problem (SOP). SOPs constrain the search space of the asymmetric Travelling Salesman Problem by virtue of the precedence constraints. Regardless, finding the optimal solution for an SOP can still be computationally hard.

In addition to the asymmetric costs and precedence constraints, another aspect that makes the drill hole planning problem, in particular, even more difficult to solve is taking the drill's orientation into account (orientation is not a variable that is considered when solving Travelling Salesman Problems). A still further complication is the fact that the environment changes as the drill operates, i.e. a drilled hole becomes an obstacle that must be avoided.

In the drill hole planning problem, the number of holes that must be drilled typically varies from 100 to over 200 which means that the SOP that must be solved is large. In general, SOPs with sites of more than about 50 are considered large. Problems including vehicle orientation as a variable (see herein below) can be large with much fewer sites, due to the continuous range of possible orientations.

FIG. 1 shows a typical drilling pattern 100 which under conventional drilling operations would be given to a drill operator to plan an appropriate drilling sequence. The drilling plan will typically show hole identification labels 102, location and drill depth 104 and identify particular holes such as angle holes and batter and buffer rows 106 determined according to the geography of the bench to be drilled. It will be seen that it is necessary to develop or to plan a drilling sequence for a very large number of holes, typically more than 100. The sequence plan must take into account any precedence constraints and dynamic obstacles such as already drilled holes. The sequence plan should also take into account the orientation of the drill while navigating from one hole location to the next.

Figure 2:
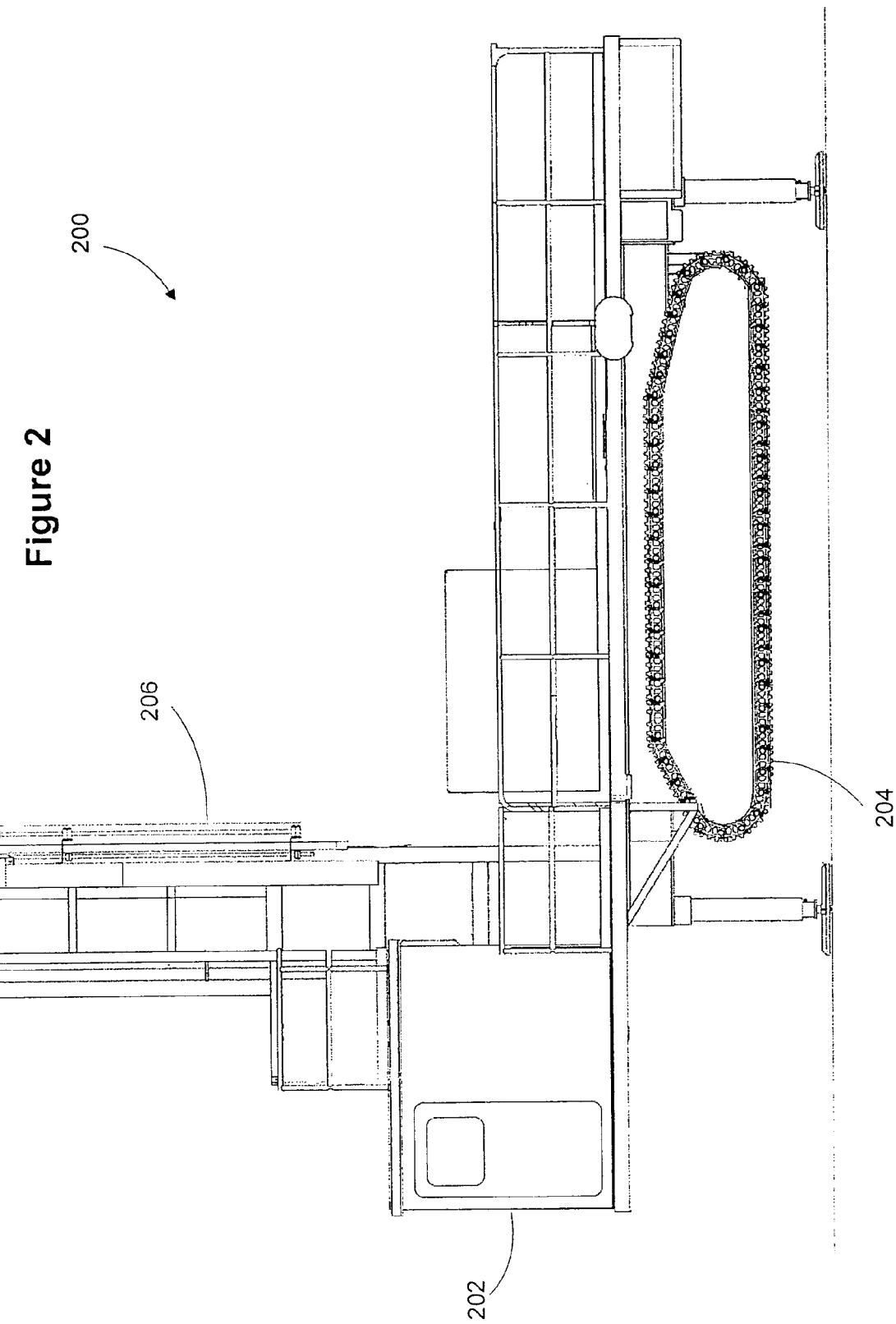
FIG. 2 shows an autonomous drill.

FIG. 2 shows an autonomous drill 200. The drill 200 comprises a self-propelled vehicle 202, which runs on a pair of parallel tracks 204 and carries a drill mast 206 with appropriate drilling equipment. The drill vehicle 202 can be driven automatically under autonomous control to specified GPS locations for drilling and the drilling equipment on the vehicle 202 can also be operated under automatic control to drill the blast holes according to the required blast hole pattern. The autonomous drill 200 may be part of an autonomous mining system described, for example, in application PCT/AU2009/000265 "Method and system for exploiting information from heterogeneous sources", filed on 4 Mar. 2009 and which is incorporated herein by reference.

The drill 200 is a tracked vehicle capable of turning on the spot towards any direction. The massive size of the drill 200 and its potential to damage the drilling surface makes accurate positioning over target hole locations difficult. Turning on the spot may not be advisable since such motions increase the chances of damaging already drilled holes by pushing dirt back down the hole requiring drilling out a second time, a very time consuming and undesirable action. The drill can therefore be modelled as a non-holonomic car-like vehicle with a constrained turning radius. This model of the drill allows generation of smooth motion plans with constrained curvature, which when executed preserve the bench's surface.

The operators select the first and last hole to drill such that the previously mentioned requirements are satisfied. The last hole is chosen in a location that allows the drill easy access away from the bench for leaving after completion of the drilling task. The first and last holes are generally given along with any precedence constraints as described earlier.

An onboard controller (eg tramming controller 814) can translate the velocity and steering angles to the correct commands in order to steer the vehicle according to the sequence plan.

Figure 8:
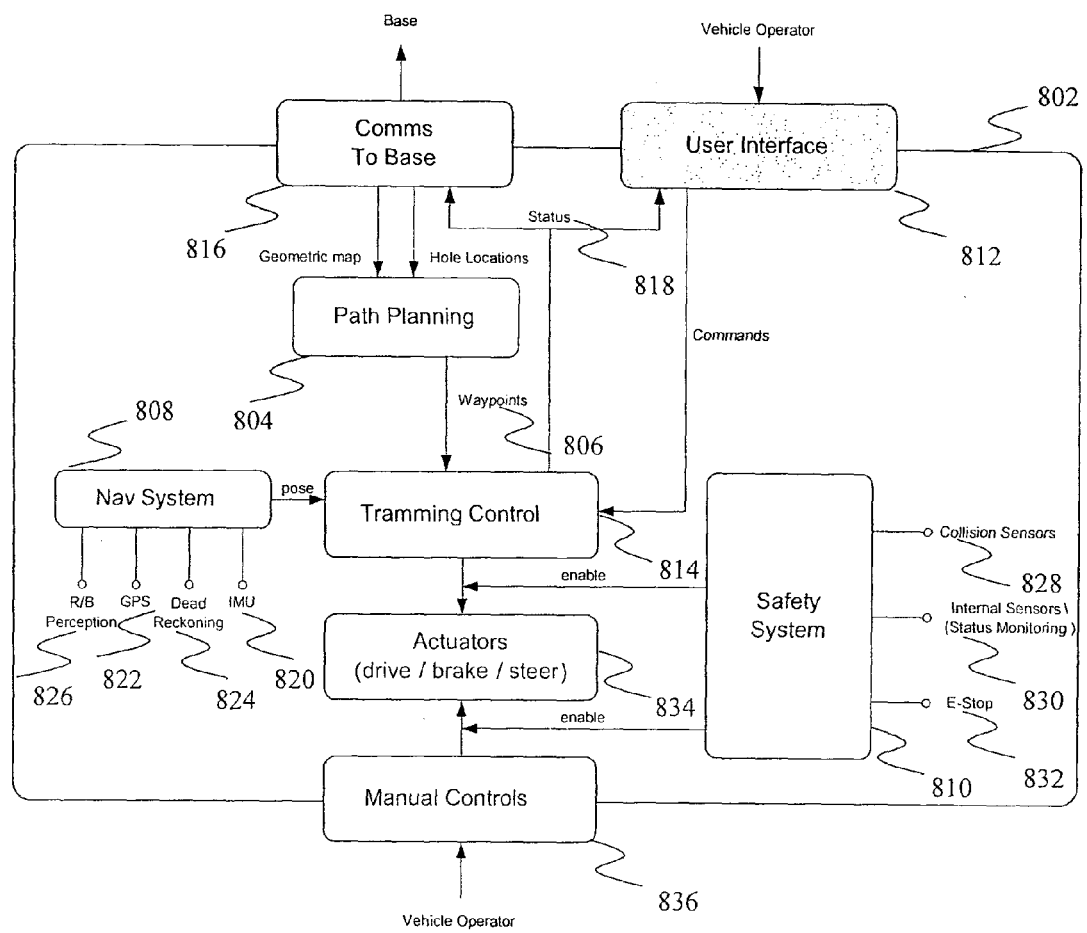
FIG. 8 is a functional block diagram of an automated tramming system for a drill.

FIG. 8 is a functional block diagram of an auto-tramming system 802 that may be used with the drill 200 to implement the drill hole planning methods described herein. For drill automation, the auto tramming unit 802 automatically trams and positions the drill over required hole locations specified in the drill pattern. The drill pattern and the bench geometry may be transmitted to the auto-tramming system 802 over communication link 816. The auto tramming unit 802 includes a path planning module 804 to automatically determine an optimised drill trajectory (indicated for example by waypoints 806) over the bench and a navigation system 808 responsible for the localisation of the drill. The navigation system fuses navigation sensor information to provide vehicle pose, where the pose includes position, velocity and attitude (PVA).

The auto tramming unit 802 can be operated in two operational modes. In the operator-aided mode, a user interface 812 informs an operator of the path and the current position of the drill and the operator is responsible for confirming drill positions.

In the fully autonomous mode, a tramming controller 814 receives the low-level decisions, providing an interface between the path planner and the navigation system. When a full control system is used for autonomous operation, no operator intervention is required and the status of the drill may be monitored remotely. Partial control is also possible to automate certain actions if an operator is present, e.g. for the autonomous positioning at a drill. The auto tramming unit 802 is designed to operate in conjunction with an auto drilling unit (not shown) in a fully autonomous drilling solution. These two units communicate and the drilling mode is activated when the drill reaches a specific hole location.

The path planning module 804 generates a set of waypoints 806 representing the trajectory of the drill. It obtains a geometric bench model and desired drill pattern and generates a drill sequence and trajectory.

The auto tramming unit 802 comprises a drill navigation system 808. It is responsible for fusing data from positional sensors for the accurate localisation of the drill. Positional sensors may include an inertial measurement unit (IMU) 820, a GPS 822, dead reckoning sensors 824 such as wheel encoders, higher-level perception sensors 826 based on laser scanners, etc. The use of redundant sensors enables integrity requirements.

In one embodiment, the auto tramming unit 802 further includes a safety system sub-unit 810, which may be responsible for monitoring the status of the drill, detecting possible collisions or other anomalies, fault detection and for implementing emergency actions. This sub-unit includes collision sensors 828, internal status monitoring sensors 830 and an emergency stop 832.

The low-level control is implemented in a tramming control sub-unit 814. This sub-unit receives waypoints 806 from the path planning module 804 and pose estimates from the navigation system 808. These estimates are used to control the vehicle actuators 834.

In the operator-aided mode, the auto tramming unit 802 further comprises a user interface sub-unit 812 and a manual control sub-unit 836. Manual vehicle controls are mechanically connected to the vehicle or connected through drive-by-wire. User interaction overrides autonomous control. The user interface sub-unit 812 is implemented as a display with the drill pattern, drill pose and intended trajectory of the machine. The manual controls sub-unit 836 provides direct access to the actuators 834 of the machine.

In one embodiment, the auto tramming unit 802 performs the following tasks:

Path planning and optimisation;
Autonomous trajectory control on bench;
Final position and pose control; and
Detection of potential collisions.

In other embodiments the path planning module may be implemented on a computer system that is not physically located on the drill 200, and the planned trajectory may be transmitted to the drill over the communications 816.

The method for solving the Sequential Ordering Problem as described here can be implemented with the use of software running on a computer system that includes a processor, memory and input/output capability coupled to a system bus. The memory stores instructions that are executed by the processor in order to perform the described method. It will be appreciated that the computer system as described is one example of many possible computer systems which have different architectures.

The path planning module 804 and/or the tramming control may be software modules running on the auto-tramming system 802.

Figure 3:
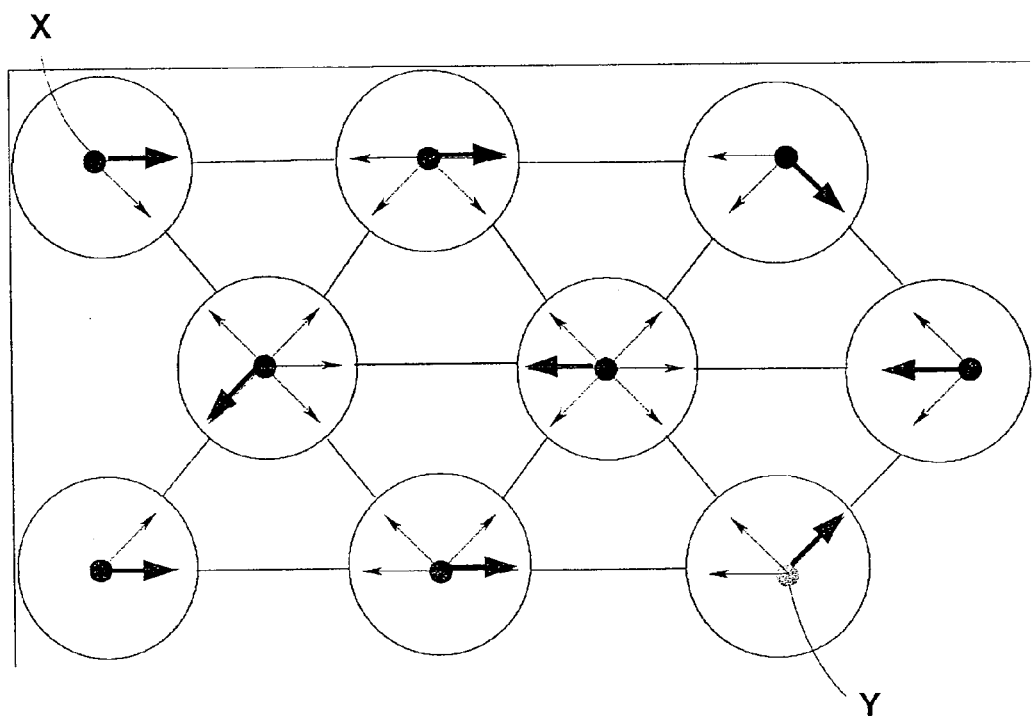
FIG. 3 illustrates possible drill orientations at drill locations.

The drilling pattern problem is a combinatorial optimisation problem which can be formulated as a Generalised Asymmetric Travelling Salesman Problem with precedence constraints. FIG. 3 presents the drill pattern drilling problem as such. The figure shows a pattern with 9 holes arranged in 3 rows. At each location, a small set of possible drill orientations is shown using arrows. The solution to the sequencing problem is to select a tour through each of the partitioned nodes, selecting one orientation out of the sampled set, such that some optimisation criterion is minimised. A possible solution is illustrated by the bold arrows between first and last holes X and Y.

The present invention provides a method of solving an ordering problem, taking into account some or all of the constraints described above, by the use of an iterative, hybrid method combining an SOP solver and a motion planner. The method may be used to generate plans for large drilling patterns.

Due to the combinatorial complexity of solving an SOP (the first component of the hybrid approach), the SOP solver may make use of an approximate optimisation algorithm. For example a Genetic Algorithm or a Swarm Intelligence algorithm may be used.

For the second component of the hybrid approach, the motion planner may use a motion planning algorithm such as a Probabilistic Roadmap (PRM) algorithm or a Rapidly-exploring Randomized Tree (RRT) search to estimate the cost of travelling from one hole to the next taking into account drill orientation, driving capabilities and non-holonomic motion constraints. In comparison to control regulation approaches, such as those based on Pontryagin's Principle, Reeds-Shepp curves, or sinusoids, PRMs and RRTs allow for obstacle avoidance (i.e. not driving over already finished holes) and for the sequence planner to optimise over various metrics, such as path length, number of turns, or travel time.

Figure 4:
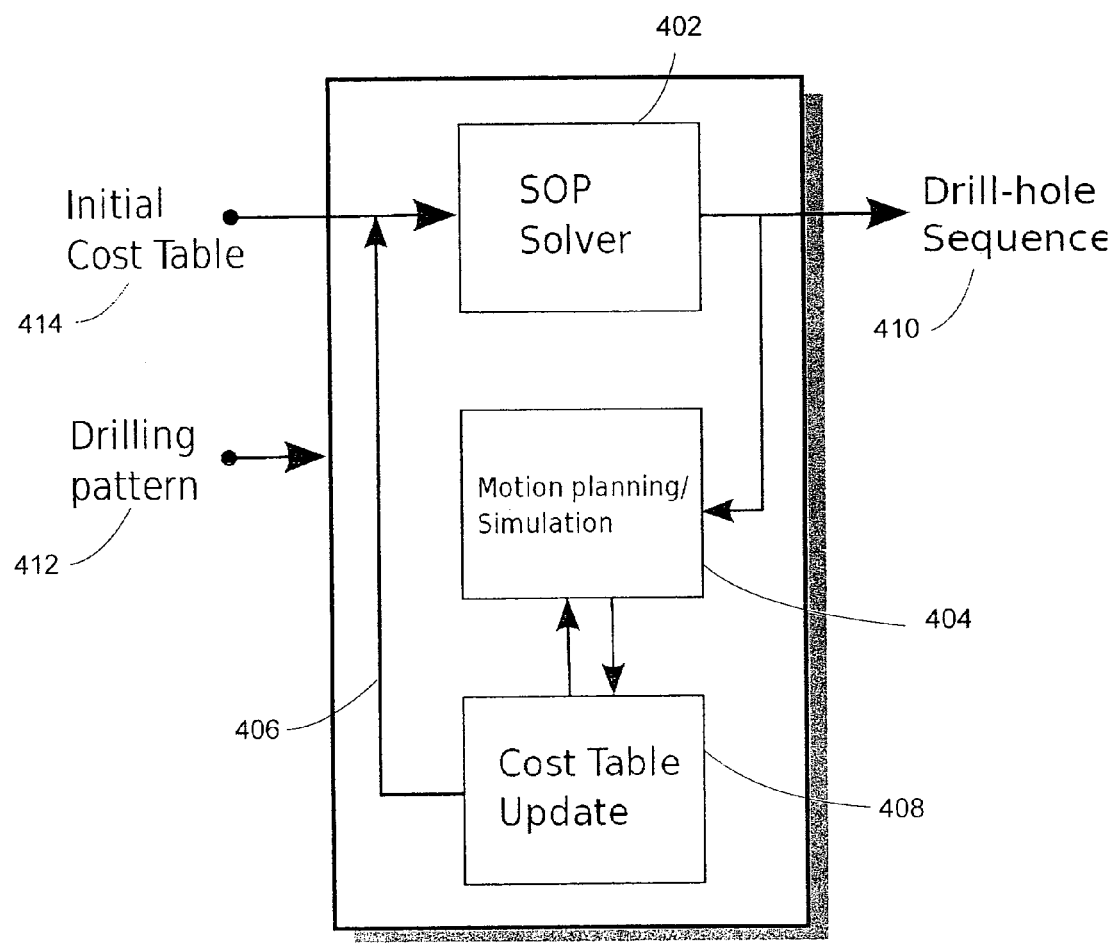
FIG. 4 is a block diagram of the solution method for drill hole planning according to the present invention.

FIG. 4 shows a block diagram of the iterative procedure for solving the drill hole planning problem in accordance with the present invention. The three main steps of the method are:
1. solving the SOP (e.g. using a Genetic Algorithm);
2. motion planning (e.g. using Probabilistic Roadmap Planning or a Rapidly-exploring Randomized Tree algorithm); and
3. updating the cost table based on the trajectories determined in the motion planning.

The procedure illustrated in FIG. 4 may be implemented as software running, for example, as the path planning module 804 of the auto-tramming system 802. Given an initial cost table 414 and a drilling pattern 412 (for example the drilling pattern 100 of FIG. 1), the SOP solver 402 employs an optimisation algorithm to produce an approximate solution 410 to the sequential ordering problem. The SOP solver uses an approximate optimisation algorithm, for example, a genetic algorithm (GA). Given this solution the motion planner 404 plans and simulates the drill motions required to execute the sequence derived by the SOP solver 402. The motion planning or simulation is used by functional module 408 to produce revised costs to update the cost table. The revised cost table 406 is then fed back to the SOP solver 402. Because the suitability of possible solutions obtained by the SOP solver 402 depends on the associated cost of a tour, the revised cost table results in an improved solution on the next iteration. This iterative procedure is repeated until convergence is achieved or some other termination criterion such as maximum number of iterations is met. In one arrangement, convergence is achieved if the tour with minimum cost remains the same or within a predefined threshold for two consecutive iterations.

Details of the procedure are provided with reference to the three functional modules 402, 404, 408 shown in FIG. 4.

1. Sequential Ordering Problem (SOP)

A genetic algorithm operates starting with a small set of solutions, the best of which are selected as building blocks for generating new and better ones. The selection mechanism is based on a fitness criterion which depends on the problem under consideration.

There are various ways of implementing genetic algorithms. For example, a genetic algorithm for use with the present invention may operate by:
1 Taking an initial population of individual solutions. The initial population may be selected at random. Alternatively the initial population may be constructed using a suitable heuristic.
2 Using a fitness function is to rank the importance of each individual in the initial population.
3 A selection of the higher ranking individual solutions is identified for giving offspring solutions. Alternatively, the selection may be made by ransom or some solutions may be selected based on their rank and others at random.
4 New individual solutions are generated by a reproduction mechanism that generates a new individual by combining components of the selected solutions (these components are sometimes referred to as 'genes'). There are two common types of reproduction mechanisms, either of which may be used: a cross-over mechanism in which the genes of two parents are combined to form the offspring; and mutation when given one parent the offspring is a randomly mutated version of the parent.
5 Optionally a local search improvement algorithm is used to improve the fitness of the offspring. Popular local improvement methods try to improve the fitness of an individual by performing 2-opt or 3-opt exchanges among its genes.
6 Steps 2 to 5 are repeated until an end condition is met. The end condition may be a user-specified number of iterations is reached, a better solution than the best one found up to the current iteration has not been found in a specified number of iterations or the improvement made in an iteration, as measured by the fitness function, is below a threshold level. The highest ranking solution, as determined by the fitness function, is then identified as the solution.

In one embodiment, the individual solutions (valid solutions that specify a complete order of visiting every hole location in the given pattern) are stored using a precedence binary matrix.

Assume an SOP to be solved with N holes to be drilled or cities using the typical TSP terminology. A tour through the cities can be represented using an N×N precedence binary matrix M, which has the following properties encoding a total ordering of the cities, a) if the i-th city comes before the j-th city in the tour then the (i,j) entry in the matrix M is set to 1
b) the (i,j) entry is set to 0 for all I such that $1 \leq i \leq N$
c) the number of 1s in M is $$\frac{N(N-1)}{2}$$

d) If the (i,j) and (j,k) entries are 1 then the (i,k) entry is also 1.

If the number of 1s in the matrix M is less than the number given above, then the matrix represents a partial ordering of the N cities; adding the remaining number of 1s without violating any of the above conditions generates a legal tour. Accordingly and referring to step 1 above, the matrix M may be initialised with solutions using an Arbitrary Insertion (AI) construction heuristic.

Referring in particular to steps 2 to 4, in some embodiments a crossover operator is used to generate new solutions from the fittest individuals in the current generation. For the case of solving an SOP, at each iteration, there is maintained a set of tours or sequences comprising the set of available individuals that can give offspring. Moreover, the fitness criterion is set to be a function of a tour's cost and in one embodiment may equal the tour's cost. Selecting the fittest tours in the current set, a crossover operator can be used to combine parts of them to generate new tours that can potentially be of lower cost. Selecting an appropriate crossover operator factors greatly, in finding good solutions quickly.

In some embodiments a 2-tournament mechanism is used to select individuals for cross-over according to their fitness values. The cross-over operator generates an offspring by first propagating the genes from the parents that they have in common as computed using a Maximum Partial Order metric. It then completes the remaining elements of the offspring using the Arbitrary Insertion algorithm which successively selects at random each of the remaining genes and inserts them in the least cost position of the partially constructed tour until all genes have been inserted and a complete individual has been constructed. This mechanism thus does not utilise mutation or a local search improvement algorithm.

This commonality-based Maximum Partial Order/Arbitrary Insertion (MPO/AI) crossover operator was introduced in S. Chen, S. Smith, "Commonality and genetic algorithms", *Technical Report CMU-RI-TR*-96-27, Robotics Institute, Carnegie Mellon University, Pittsburgh, Pa., December 1996. In summary, given the precedence binary matrix M referred to previously, an algorithm for computing the MPO operates by:
1) Given are 2 matrices M1 and M2 representing 2 complete tours through N cities assuming that both tours start at the same city.
2) Intersect the matrices M1 and M2 to generate the N×N matrix P such that the (i,j) entry of P is set to 1 only if the (i,j) entries of M1 and M2 are both 1; it is set to 0 if otherwise. Note that $1 \leq i \leq N$ and $1 \leq j \leq N$.
3) Sum the columns of P to get the number of predecessors of each city.
4) Build the partial order graph.
4.1) Repeat until all cities have been added to the graph
4.1.1) Find the city with fewest predecessors (break ties at random)
4.1.2) Attach city to the predecessor with the most ordered predecessors (break ties at random).
5) Find the longest path in the graph (break ties at random); this path is the Maximum Partial Order for the two parents M1 and M2

The MPO tour can be completed using the Arbitrary Insertion (AI) or any other suitable construction heuristic.

Figure 5:
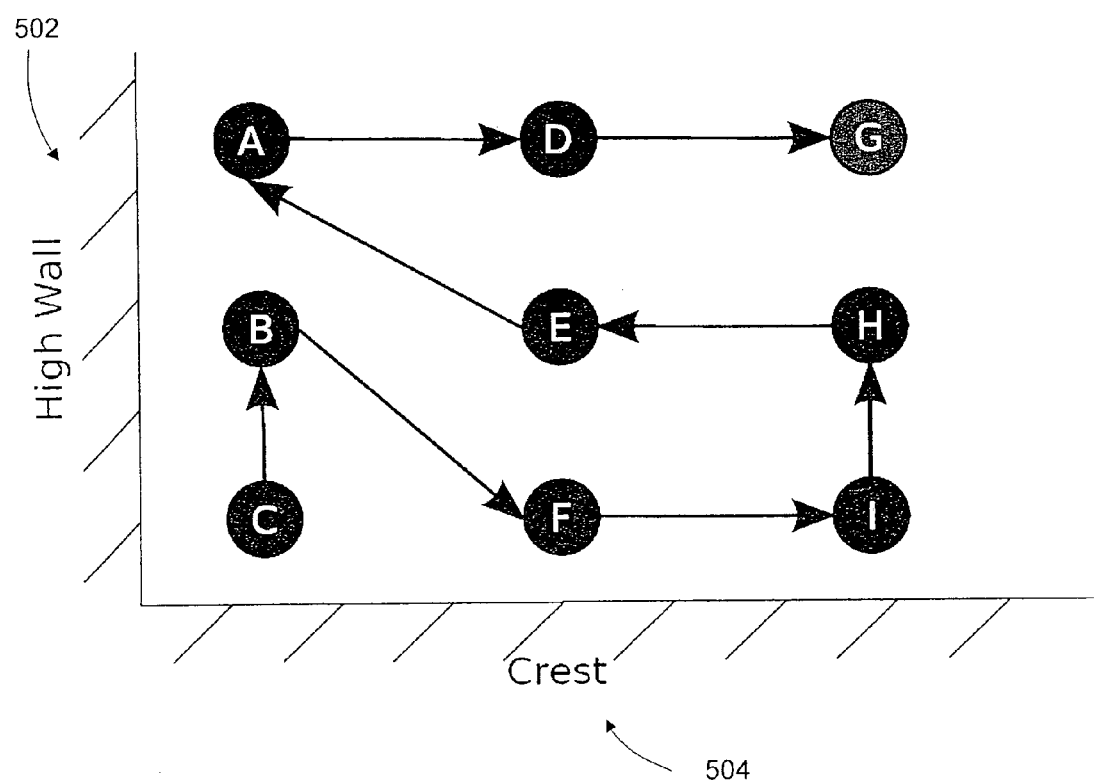
FIG. 5 shows an example solution for a simplified drilling pattern with nine holes.

Use of the MPO/AI operator to solve a small SOP with nine holes is illustrated in FIG. 5. The figure shows holes located against a high wall 502 and a crest 504 requiring a starting location C and a desired goal location G. The precedence constraints for this problem are defined as follows:
1. Crest (angle-holes): C before B, F before E, and I before H.
2. High-wall (face/adjacent holes): A before D, B before E, and C before F.

These constraints satisfy the established drilling guidelines that holes near a crest or a high wall must be drilled first. For this example, the cost to travel between any two holes can be set to the Euclidean distance between them. In this particular case, the cost table is symmetric. The solution is shown in FIG. 5 using arrows and it can be seen that all the constraints are satisfied by the sequence C-B-F-I-H-E-A-D-G.

Other cross-over operators may be used or optimisation may be performed differently, for example by a Swarm Intelligence algorithm (see, for example, G. Venter, "Particle swarm optimisation", *AIAA Journal*, pp 1583-1589, 2002). Alternative approaches include an Ant Colony Optimisation algorithm as disclosed in L. M. Gambardella, M. Dorigo, "An ant colony system hybridized with a new local search for the sequential ordinary problem", *INFORMS Journal on Computing* 12(3), pp 237-255, 2000.

Computing the optimal sequence is complicated by the fact that with the exception of special holes the rest can be drilled with the vehicle at any orientation. Because of this the sequencing problem is of the Generalized TSP kind; the Generalised TSP with symmetric costs and no precedence constraints is also similar to the group Steiner tree problem for which computationally efficient approximate solution methods exist. However, dealing with asymmetric costs and precedence constraints add complexity not dealt with by many existing solutions. The drilling problem is a formulation of the Generalised Asymmetric Travelling Salesman Problem with precedence constraints for which approximate solution methods exist but may not scale well to solving large problem instances such as those that arise in mining.

Consequently, to reduce the problem into the easier to solve case of a non-partitioned graph considering a single configuration at each hole location, a heuristic method for selecting the orientation of the drill for each hole may be applied. Two example heuristic methods that may be used are:

Fixed Orientation: A fixed orientation for all holes is used. Drill patterns are designed to be drilled with the vehicle moving in straight lines and facing towards a fixed direction which is often North, although this depends on the established guidelines for the particular mining operation.

Two-step lookahead: The orientation is set according to the direction of motion two steps ahead. The order is the one selected in the last tour computed given the most recently updated cost table. A step is a motion to the next hole in the drilling sequence. Thus, for example, in the illustrative sequence of FIG. 5, assume that the vehicle is at location C facing North towards location B. Then, the orientation at B after completing the motion from C to B will be in the direction of location F which is next in the tour or the second step in motion from C to F via B (the first step is the motion from C to B and the second step is the motion from B to F.)

Other heuristics may be used to reduce the number of orientations requiring consideration. One example includes setting a single orientation for each node at random. Another example is randomly selecting a set of two or more possible orientations for each node. Another example is setting the possible orientations as directed towards the nearest neighbouring drill holes, for example those within a defined radius of the location of the current node.

Referring to FIG. 4, in one arrangement the drill orientation is set between the SOP solver 402 and the motion planning module 404. Given a drill-hole sequence 410, a drill orientation is set for each location using one of the heuristic methods, and the motion planning module 404 uses the set orientations when generating a path between drill holes.

A potential problem with the GA approach to solving the SOP is that a considerable amount of processing time may be required before a good solution is found. However, the end conditions for the GA can be set so that time taken to solve the SOP is only a small fraction of the time required to solve the complete sequencing problem with most time spent on the motion planning (or simulation) component.

2. Motion Planning

The motion planning and simulation module 404 considers the motions and input commands that would be needed to control the process of travelling between a set of holes. Motion planning considers both space, in the form of the trajectory to be driven, and time, in the form of velocity and related derivatives. The problem is non-linear because, as with a car, the drill cannot move sideways. It also involves local optimisation because smoother, more efficient motions (e.g. with less jerk and larger radius turns) need to be selected from a continuous control set. Local optimisation is done by factoring machine constraints (i.e. the set of physically achievable operations) such as:

Non-holonomic motion: The machine cannot drive along its perpendicular. More specifically the differential constraint that governs the machine's position is not integrable.

Traction: If the differential between the track speeds is large, the drill tracks may slip relative to the ground (the drill is a rigid body). This slippage causes wear and adds to navigation uncertainty.

Within the set of valid solutions, the motion planning 404 selects optimal motions that factor in operating criteria such as:

Turning Radius: While the drill can technically turn on the spot (i.e. its minimum turning radius is zero), such motion is undesirable as it involves high forces and moments which stress the mechanism. Thus it is preferred to turn with larger, smoother arcs.

Speed: The tracks drive up to a given speed (for example approximately 1 m/s).

Thus the motion found is not only a valid one, but one that is (approximately) optimal against continuous motion variables. This can also be done in conjunction with later optimisations against performance metrics, for example travel distance, consumables, cost and time.

The motion planning problem can be approached by modelling the system as a series of differential equations for which adaptive operation is achieved through feedback control laws. While such a control theoretic solution efficiently represents the mechanical limitations in a continuous manner, such a solution is complicated by non-linearity, boundary conditions, contacts, and environmental obstacles. This can be treated through bounding the model with piece-wise functions. Alternatively, this notion can be extended to transform the problem into a discrete, decision-making problem to which a search is applied.

This general motion planning problem is normally solved in the configuration space C which is the space of all possible placements of the moving object. Each degree of freedom of the object corresponds to a dimension of the configuration space C. The space C can be separated into free sections $C_{free}$ which correspond to areas without obstacles (such as drill holes), and unreachable portions can be labelled $C_{obstacle}$. The planner samples space C for free configurations and tries to connect these into a roadmap of feasible motions. The problem is difficult given the number of dimensions and coupling of the problem. However, to find a valid solution the full extent of C is not needed because a (random) candidate solution can be tested for validity. Hence the notion of sampling-based motion planning, which searches in the local space (via a local planner that incorporates short-horizon kinematics or dynamics and differential constraints) from which the total motion plan is assembled.

The Probabilistic Roadmap Planner (PRM) is an efficient and provably complete algorithm for such motion planning as shown in K. I. Tsianos, I. A. Sucan, L. E. Kavraki, "Sampling-based robot motion planning: Towards realistic applications", *Computer Science Review*, I(1):2-11, 2007.

Figure 6:
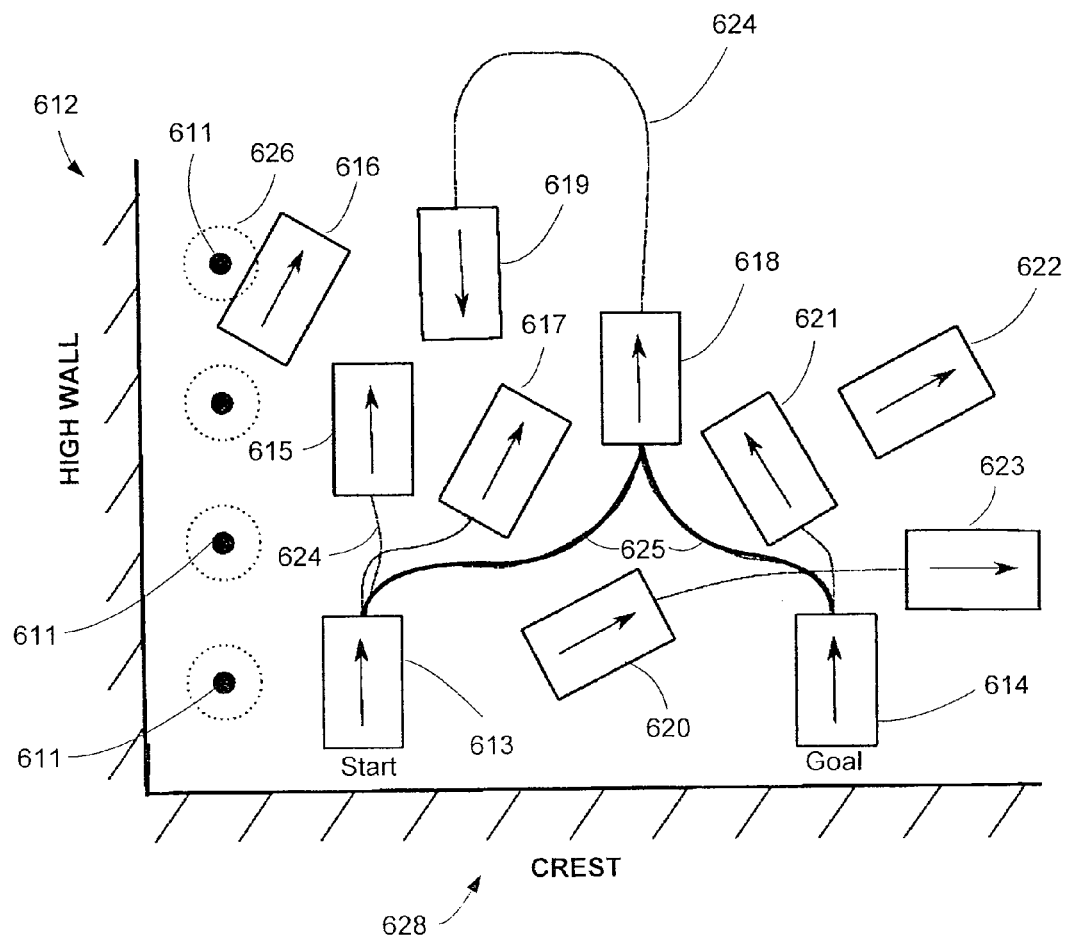
FIG. 6 shows a simplified example of solving the drilling problem using probabilistic road maps.

As illustrated in FIG. 6, the PRM operates in a two step manner. First, a graph-search framework is used in which the configuration-space, in the example of drill hole planning the bench including obstacles, is randomly sampled for collision-free placements of the vehicle. Where a random sample indicates a collision-free placement, it is added as a node in a roadmap graph. This is repeated for the required number of nodes. The number of nodes is selected as a trade-off between finding a solution close to the optimal solution and reducing the computation resources required for the PRM.

Then the link between pairs of nodes is calculated using a local motion model, called the "local planner," the solution of which factors relevant dynamics and differential constraints to determine the achievability and metric cost for the randomly sampled configuration space points by leveraging small-time local controllability (see for example, S. M. La Valle. *Planning Algorithms*. Cambridge University Press, Cambridge, U.K., 2006). Different primitives may be used within the RRT and PRM frameworks depending on the motion planning requirements. For example, Reeds-Shepp curves may be used with an RRT planner and Cornu Spiral steering functions may be used with a PRM planner. Graph-search algorithms, for example, A*, Depth First Search, Breadth First Search may then be used to determine the solution between the initial and final configurations. It should be noted that the PRM approach does not explicitly specify the operating space, local planner, sampling strategy, or search mechanism.

In the example shown in FIG. 6, a series of holes 611 have already been drilled adjacent a high wall 612 and must be avoided. The crest 628 provides another constraint. The drill has a specified start location 613 and goal location 614. A number of sampled states are shown at 615 to 623 and the results of the local planner connecting them are shown by lines 624. The plan found is shown by dark lines 625. One of the sampled states 616 is invalid because it is within the safety bounds 626 of one of the drilled holes 611.

Two of the drill's constraints are that the drill cannot drive sideways, and its turning speed is limited by the rate of an individual track because the drill turns by slowing down one of its tracks. Given low speeds, the drill can be modelled as a "simple" kinematic car moving on a plane. The drill's motion is modelled in both operation space, that is the global, external (GPS) location of the drill as described with reference to FIG. 6, as well as configuration space (the local location and orientation of the drill on the plane).

Figure 7:
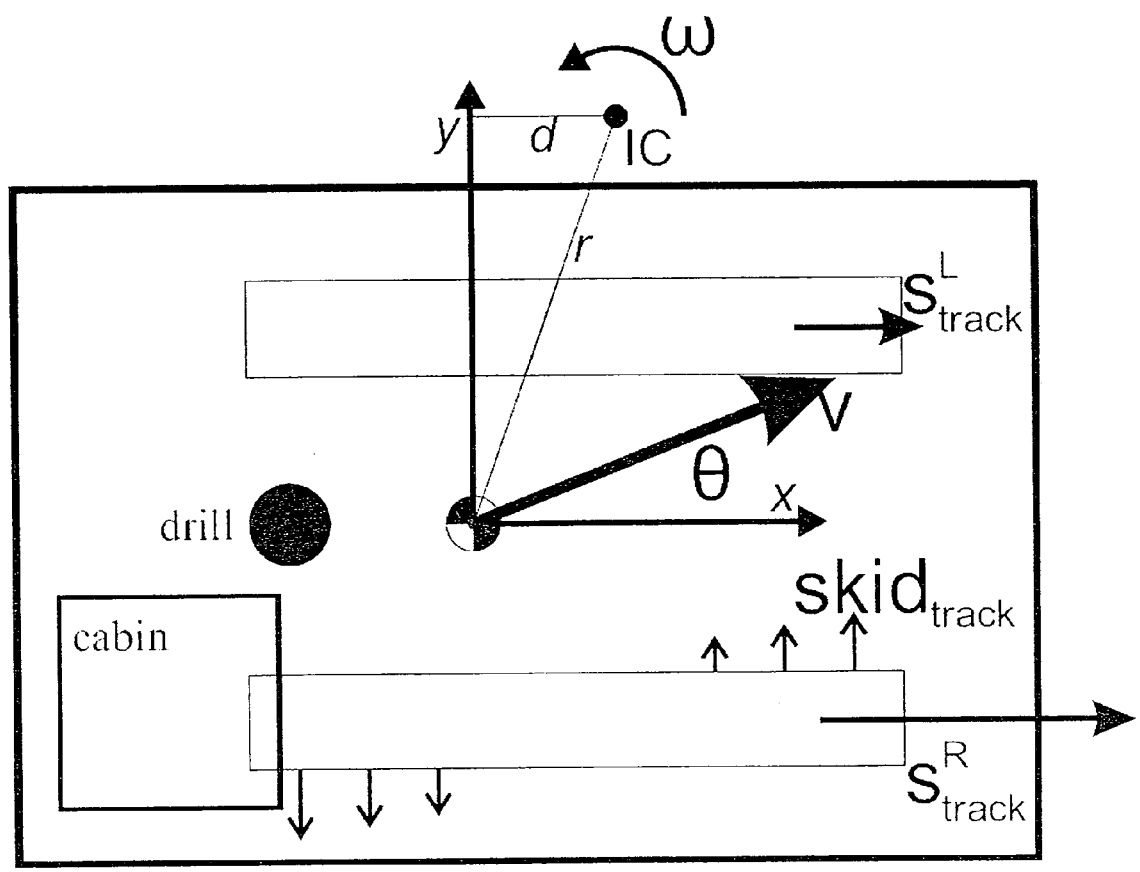
FIG. 7 illustrates factors to be taken into account in planning drill motions.

Referring to FIG. 7, the motion planner determines the motion in the drill's configuration space (local position (x,y) and heading ($\theta$)) by searching for valid motions (velocity (v) and turn-rate ($\omega$)) that are admissible given the actuator control in terms of track speeds $S_{track}^{L/R}$ for the nearby vicinity. The drill's external, state-space position is then checked to be valid and obstacle free.

The drill's configuration space is $C=(x,y,\theta)$. The non-holonomic constraint can be simplified as $$\dot{x}\sin(\theta)-\dot{y}\cos(\theta)=0 \qquad (1)$$

and $$\omega = \frac{(S_{track}^R - S_{track}^L)}{d} \qquad (2)$$

The drill mechanics limit the track speeds. The control of their motion can be represented as $u=(u_{right}, u_{left})$. This can be normalised against the maximum speed to give $u \in [-1,1]$ which is to say that the drill tracks can go full speed forward or full speed backwards. However, to reduce skid and stress on the tracks, it is desirable to select solutions that limit $\omega$ (i.e. limit the difference between $S_{track}^R$ and $S_{track}^L$).

To constrain the drill's motion to a greater than a non-zero minimum turning radius, for example so that the drill moves about a centre of rotation not on the vehicle, the drill's motion can instead be modelled as follows. The drill's motion is constrained by the track speeds ($S_{track}^R$ and $S_{track}^L$) and the minimum turning radius. Given a baseline, d, and assuming a left (counter-clockwise positive) turn, a turning ratio is defined as:

$$K = \frac{S_{track}^R}{S_{track}^L} \qquad (3)$$

The turning radius, R, can then be written as:

$$R = \frac{d(K+1)}{2(K-1)} \qquad (4)$$

and the angular velocity of the turn can then be written as:

$$\omega = \frac{S_{track}^L(K-1)}{d} \qquad (5)$$

As an any-time method, a sequence is always available and with its quality being improved while the solution is being iterated. Given a user-specified metric (e.g. minimum operation time), the simulation is used to determine the quality of a sequence as part of an optimisation of the result.

As an alternative technique to PRM for assessing the true cost of travelling from one hole location to the next, the motion planner may use a randomized motion planning algorithm such as the bi-directional Rapidly-exploring Randomized Tree (RRT) algorithm described in P. Cheng, Z. Shen, S. M. La Valle, "RRT-based trajectory design for autonomous automobiles and space-craft", *Archives of Control Sciences* 11 (3-4), pp 167-194, 2001.

The motion planner generates a valid path connecting two configurations of the drill vehicle modelled using non-holonomic constraints. Because the PRM and RRT algorithms uses sparse sampling, they are not guaranteed to find the shortest path between any two configurations (although if given sufficient time and if a solution for the problems exists, RRTs would be guaranteed to find this solution). A post-processing step can be used to shorten the computed trajectories. This step generates shorter paths than the basic algorithm. It can be shown that such multi-goal planners will converge if the estimated tour cost is not larger than twice the optimal tour cost.

As an example of the post-processing step, consider a PRM planner with a spiral steering function trying to find a path from state $C_{free}^i$ to state $C_{free}^l$. The planner finds a path that goes through two intermediate states $C_{free}^j$ and $C_{free}^k$ such that the solution is $C_{free}^i \to C_{free}^j \to C_{free}^k \to C_{free}^l$. It is possible that a direct and shorter path from $C_{free}^i$ to $C_{free}^k$ free exists such that there is no need to go through $C_{free}^j$. The post-processing step tries to find such shortcuts that were missed by the PRM method. So, if a path $C_{free}^i \to C_{free}^k$ that is shorter than $C_{free}^i \to C_{free}^j \to C_{free}^k$ exists, then the final path becomes $C_{free}^i \to C_{free}^k C \to C_{free}^l$. The post-processing step may use any suitable heuristic. An example is dividing a tour into a number of paths, randomly selecting non-adjacent pairs of states within a path and then applying the PRM planner to that local problem to attempt to find a better solution. The post-processing step may be limited, for example, by selecting a fixed number of paths from a tour and a fixed number of pairs of states within each path.

In some embodiments, the path planning may be performed using a look-up table, either alone or in combination with a solution to the path planning problem described above.

Where the bench has previously been travelled by a vehicle, for example a manually operated vehicle and the path travelled has been recorded, then the travel path may be entered into a look-up table. For example, the travel path may be entered as a series of waypoints entered as co-ordinates on the bench. Following completion of an iteration of the SOP solver, the look-up table is consulted for adjacent waypoints that correspond to consecutive drill hole locations. The requirement for correspondence includes a specified tolerance, for example 1 meter in any direction. Where two waypoints and two drill sites correspond in this way, the path travelled between the waypoints is used as the path between the corresponding drill sites and the cost of travel, according the selected cost metric is entered into the updated cost table (see below). Where an sequential pair of drill sites do not correspond to adjacent waypoints, or if the trajectory between the corresponding waypoints is not clear (i.e. it directs the vehicle to traverse an obstacle), then the path planner, for example the PRM planner, is used to resolve a path as described above.

For some drill hole patterns, particularly those with a well established look-up table of possible motions through the bench, the number of iterations through the SOP solver and motion planner may be substantially reduced. In the limit, the SOP and motion planner may be run once and not repeated.

3. Updating the Cost Table

The initial cost table used for the first iteration of the SOP solver may be set as a lower bound of the cost metric that has been selected. For example, if the cost metric is distance, then the initial cost table may be set as the straight line distance between drill hole sites.

The trajectories computed by the motion planning module 404, including any trajectories determined using a look-up table as described above, are used to calculate the cost of moving from hole to hole according to the sequence provided by the SOP solver 402. As previously described, the cost is calculated using specified metrics that may, for example, be a function of variables including path length, time required for trajectory, fuel usage etc. Obstacles and other constraints are encoded implicitly in the cost table 406.

The updated cost table 406 is fed back as an input to the next iteration of the SOP solver 402.

4. General Application

The specific algorithms discussed above have been advanced by way of example only. It is to be understood that other algorithms may be used in the SOP solver and/or the motion planner to perform iterative procedures in accordance with the present invention. Furthermore the application is not limited to drill hole planning, but can be extended to include, for example, path planning for machines. The iterative procedures outlined herein may be applied generally to sequential ordering problems in which a machine has to travel to a series of locations in an environment with obstacles and in which the machine's motion constraints affect the travel between points in the sequence. The described procedures are generally applicable to a variety of vehicle classes (including, for example, cars, trailers and segmented vehicles). Examples of applications include allocating machines in underground block caving mining operations.

As explained above, the formation of a hole-drilling sequence plan has a number of characteristics that distinguish it from the standard travelling salesman problem. These characteristics include asymmetry in cost between locations, precedence of locations, orientation of the machine and environmental changes caused by the travelling machine. These characteristics may be present in other ordering problems, to a greater or lesser extent and the iterative process of the present invention may be applied to sub-combinations of these characteristics. For example, the use of orientation as a cost metric may be omitted, so that there is a combination of asymmetric cost tables, precedence and environmental changes that can be dealt with using the iterative process as described above. Further examples are accommodating the combination of precedence and environmental changes, with or without orientation and with or without asymmetry. In other combinations environmental changes may be omitted from the constraints.

In addition, further variables may be added to the characteristics without departing from the scope of the present invention.

It will be understood that the invention disclosed and defined in this specification extends to all alternative combinations of two or more of the individual features mentioned or evident from the text or drawings. All of these different combinations constitute various alternative aspects of the invention.

What is claimed is:

1. A method to operate a mobile autonomous drill, the method comprising:
   determining an initial version of a cost table of costs of travel by the mobile autonomous drill between one or more drill hole locations in a drilling pattern;
   inputting into a Sequential Ordering Problem (SOP) solver data reflecting the drill hole locations in the drilling pattern and the initial version of the cost table to derive, by a SOP solving procedure, a potentially optimal drilling sequence;
   inputting data reflecting the potentially optimal drilling sequence into a motion planner to derive, by a motion planning procedure, a plan of drill motions to be executed by the mobile autonomous drill through the potentially optimal drilling sequence and a revised version of the cost table resulting from the plan of drill motions to be executed by the mobile autonomous drill; and
   determining a hole-drilling sequence plan based on successively repeating the SOP solving and motion planning procedures by operation of the SOP solver and motion planner with successive revised versions of the cost table inputted to the SOP solver, wherein the SOP solving and motion planning procedures are executed in one or more processors of a computer system and wherein the computer system is in communication with the mobile autonomous drill via an auto-tramming system;
   transmitting the hole-drilling sequence plan to the auto-tramming system over a communication link, wherein the auto-tramming system includes a path planning module to automatically determine an optimized drill trajectory based on the hole drilling sequence plan and a navigation system to determine a localization of the mobile autonomous drill and wherein the auto tramming system is operated in at least one of an operator-aided mode or a fully autonomous mode; and
   operating the mobile autonomous drill based on the optimized drill trajectory and the localization.

2. The method of claim 1, further comprising:
   determining precedence constraints, wherein the precedence constraints determines that one or more holes at one or more of the drill hole locations in the drilling pattern are to be drilled before one or more holes at one or more other drill hole locations in the drilling pattern; and
   inputting data reflecting the precedence constraints into the SOP solver, wherein the SOP solver uses the data reflecting the precedence constraints with the data reflecting the drill hole locations in the drilling pattern and the initial version of the cost table to derive, by the SOP solving procedure, the potentially optimal drilling sequence.

3. The method of claim 1, further comprising:
   determining a preferred drill orientation for each of the drill hole locations in the drilling pattern; and
   inputting data reflecting the preferred drill orientations into the motion planner, wherein the motion planner uses the data reflecting the preferred drill orientations with the data reflecting the potentially optimal drilling sequence to derive the plan of drill motions and the revised version of the cost table resulting from the plan of drill motions.

4. The method of claim 1, further comprising:
   determining motion constraints to movements of the mobile autonomous drill; and
   inputting data reflecting the motion constraints into the motion planner, wherein the motion planner uses the data reflecting the motion constraints with the data reflecting the potentially optimal drilling sequence to derive the plan of drill motions and the revised version of the cost table resulting from the plan of drill motions.

5. The method of claim 4, wherein the motion constraints include an obstacle avoidance constraint.

6. The method of claim 5, wherein the obstacle avoidance constraint prevents a drill travel path which would result in travelling over an already drilled hole.

7. The method of claim 4, wherein the motion constraints include non-holonomic motion constraints limiting the possible directions of travel of the drill.

8. The method of claim 4, wherein the motion constraints include limits on a maximum speed of motion of the drill.

9. The method of claim 4, wherein the motion constraints include limits on a rate of change of direction of motion of the drill.

10. The method of claim 1, wherein the successive repetitions of the SOP solving and motion planning procedures are continued until a predetermined termination criterion is met.

11. The method of claim 10, wherein the termination criterion is met if successive plans generated by the motion planner are the same or within a predetermined threshold of similarity.

12. The method of claim 10, wherein the termination criterion is met by completion of a predetermined number of repetitions of the SOP solving and motion planning procedures.

13. The method of claim 1, wherein the SOP solver uses a genetic algorithm.

14. The method of claim 1, wherein the SOP solver uses a Swarm Intelligence algorithm.

15. The method of claim 1, wherein the SOP solver uses an Ant Colony Optimisation algorithm.

16. The method of claim 1, wherein the motion planner uses a Probabilistic Roadmap motion planning algorithm.

17. The method of claim 1, wherein the motion planner uses a Rapidly-exploring Randomized Tree algorithm.

18. A method to operate an autonomous drill to drill blast holes in surface mining, the method comprising:
   determining an initial version of a cost table of costs of travel by the autonomous drill between one or more drill hole locations in a drilling pattern;
   inputting into a Sequential Ordering Problem (SOP) solver data reflecting the drill hole locations in the drilling pattern and the initial version of the cost table to derive, by a SOP solving procedure, a potentially optimal drilling sequence;
   inputting data reflecting the potentially optimal drilling sequence into a motion planner to derive, by a motion planning procedure, a plan of drill motions to be executed by the autonomous drill through the potentially optimal drilling sequence and a revised version of the cost table resulting from the plan of drill motions to be executed by the mobile autonomous drill; and
   determining a hole-drilling sequence plan based on successively repeating the SOP solving and motion planning procedures by operation of the SOP solver and motion planner with successive revised versions of the cost table inputted to the SOP solver, wherein the SOP solving and motion planning procedures are executed in one or more processors of a computer system and wherein the computer system is in communication with the mobile autonomous drill via an auto-tramming system;
   transmitting the hole-drilling sequence plan to the auto-tramming system over a communication link, wherein the auto-tramming system includes a path planning module to automatically determine an optimized drill trajectory based on the hole drilling sequence plan and a navigation system to determine a localization of the mobile autonomous drill and wherein the auto tramming system is operated in at least one of an operator-aided mode or a fully autonomous mode; and
   operating the mobile autonomous drill based on the optimized drill trajectory and the localization.

19. The method of claim 18, wherein the autonomous drill is controlled to execute the plan of drill motions through the potentially optimal drilling sequence.

20. An apparatus to operate a drill, comprising:
   at least one processing unit; and
   at least one memory for storing instructions for execution by the at least one processing unit, the execution of the instructions providing:
   a Sequential Ordering Problem (SOP) solver configured to receive data reflecting one or more drill hole locations in a drilling pattern and an initial version of a cost table of costs of travel by the drill between the one or more drill hole locations in the drilling pattern and to derive, by a SOP solving procedure, a potentially optimal drilling sequence;
   a motion planner configured to receive data reflecting the potentially optimal sequence and to derive, by a motion planning procedure, a plan of drill motions to be executed by the drill through the potentially optimal drilling sequence and a revised version of the cost table resulting from the plan of drill motions to be executed by the drill; and
   a data transfer connection between the motion planner and the SOP solver to feed the revised version of the cost table to the SOP solver, wherein the SOP solver and the motion planner are each configured to perform successive SOP solving and motion planning procedures with successive revised versions of the cost table inputted to the SOP solver, wherein the successive SOP solving and motion planning procedures are used to determine a hole-drilling sequence plan, and wherein the apparatus is configured to be in communication with the drill via an auto-tramming system;
   the auto-tramming system configured to receive the hole-drilling sequence plan from the apparatus over a communication link, wherein the auto-tramming system includes a path planning module configured to automatically determine an optimized drill trajectory based on the hole drilling sequence plan and a navigation system configured to determine a localization of the mobile autonomous drill and wherein the auto tramming system is configured to be operated in at least one of an operator-aided mode or a fully autonomous mode; and
   the apparatus configured to be in communication with the auto-tramming system to operate the drill based on the optimized drill trajectory and the localization.

21. The apparatus of claim 20, wherein the SOP solver is further configured to receive data reflecting precedence constraints wherein the precedence constraints determine that one or more holes at one or more of the drill hole locations in the drilling pattern are to be drilled before one or more holes at one or more other locations in the drilling pattern and wherein the SOP solver is further configured to use the data reflecting the precedence constraints with the data reflecting the drill hole locations in the drilling pattern and the initial version of the cost table to derive, by the SOP solving procedure, the potentially optimal drilling sequence.

22. The apparatus of claim 20, wherein the motion planner is further configured to receive data reflecting a preferred drill orientation for each of the drill hole locations in the drilling pattern and wherein the motion planner is further configured to use the data reflecting the preferred drill orientations with the data reflecting the potentially optimal drilling sequence to derive the plan of drill motions and the revised version of the cost table resulting from the plan of drill motions.

23. The apparatus of claim 20, wherein the motion planner is further configured to receive data reflecting motion constraints to movements of the drill and wherein the motion planner is further configured to use the data reflecting the motion constraints with the data reflecting the potentially optimal drilling sequence to derive the plan of drill motions and the revised version of the cost table resulting from the plan of drill motions.

24. The apparatus of claim 20, wherein the SOP solver uses at least one of a genetic algorithm, a Swarm Intelligence algorithm, or an Ant Colony Optimisation algorithm.

25. The apparatus of claim 20, wherein the motion planner uses at least one of a Probabilistic Roadmap motion planning algorithm or a Rapidly-exploring Randomized Tree algorithm.

26. A method to operate an autonomous vehicle, the method comprising:
   determining an initial version of a cost table of costs of travel by the autonomous vehicle between one or more specified locations in a travel pattern;
   inputting into a Sequential Ordering Problem (SOP) solver data reflecting the specified locations in the travel pattern and the initial version of the cost table to derive, by a SOP solving procedure, a potentially optimal travelling sequence;
   inputting data reflecting the potentially optimal travelling sequence into a motion planner to derive, by a motion planning procedure, a plan of vehicle motions to be executed by the autonomous vehicle through the potentially optimal travelling sequence and a revised version of the cost table resulting from the plan of vehicle motions to be executed by the autonomous vehicle; and
   determining a travelling sequence plan based on successively repeating the SOP solving and motion planning procedures by operation of the SOP solver and motion planner with successive revised versions of the cost table inputted to the SOP solver, wherein the SOP solving and motion planning procedures are executed in one or more processors of a computer system and wherein the computer system is in communication with the autonomous vehicle via an auto-tramming system;
   transmitting the travelling sequence plan to the auto-tramming system over a communication link, wherein the auto-tramming system includes a path planning module to automatically determine an optimized travel trajectory based on the travelling sequence plan and a navigation system to determine a localization of the autonomous vehicle and wherein the auto tramming system is operated in at least one of an operator-aided mode or a fully autonomous mode; and
   operating the autonomous vehicle based on the optimized travel trajectory and the localization.

27. A computer program product comprising machine-readable program code recorded on a non-transitory machine-readable recording medium, for controlling at least one operation of a data processing apparatus on which the program code executes to perform a method to operate a drill, the method comprising:
   determining an initial version of a cost table of costs of travel by a drill between one or more drill hole locations in a drilling pattern;
   inputting into a Sequential Ordering Problem (SOP) solver data reflecting the drill hole locations in the drilling pattern and the initial version of the cost table to derive, by a SOP solving procedure, a potentially optimal drilling sequence;
   inputting data reflecting the potentially optimal drilling sequence into a motion planner to derive, by a motion planning procedure, a plan of drill motions to be executed by the drill through the potentially optimal drilling sequence and a revised version of the cost table resulting from the plan of drill motions to be executed by the drill; and
   determining a hole-drilling sequence plan based on successively repeating the SOP solving and motion planning procedures by operation of the SOP solver and motion planner with successive revised versions of the cost table inputted to the SOP solver, wherein the SOP solving and motion planning procedures are executed in one or more processors of a computer system and wherein the computer system is in communication with the drill via an auto-tramming system;
   transmitting the hole-drilling sequence plan to the auto-tramming system over a communication link, wherein the auto-tramming system includes a path planning module to automatically determine an optimized drill trajectory based on the hole drilling sequence plan and a navigation system to determine a localization of the drill and wherein the auto tramming system is operated in at least one of an operator-aided mode or a fully autonomous mode; and
   operating the drill based on the optimized drill trajectory and the localization.

28. A computer program product comprising machine-readable program code recorded on a non-transitory machine-readable recording medium, for controlling at least one operation of a data processing apparatus on which the program code executes to perform a method to operate an autonomous vehicle, the method comprising:
   determining an initial version of a cost table of costs of travel by the autonomous vehicle between one or more specified locations in a travel pattern;
   inputting into a Sequential Ordering Problem (SOP) solver data reflecting the specified locations in the travel pattern and the initial version of the cost table to derive, by a SOP solving procedure, a potentially optimal travelling sequence;
   inputting data reflecting the potentially optimal travelling sequence into a motion planner to derive, by a motion planning procedure, a plan of vehicle motions to be executed by the autonomous vehicle through the potentially optimal travelling sequence and a revised version of the cost table resulting from the plan of vehicle motions to be executed by the autonomous vehicle; and
   determining a travelling sequence plan based on successively repeating the SOP solving and motion planning procedures by operation of the SOP solver and motion planner with successive revised versions of the cost table inputted to the SOP solver, wherein the SOP solving and motion planning procedures are executed in one or more processors of a computer system and wherein the computer system is in communication with the autonomous vehicle via an auto-tramming system;
   transmitting the travelling sequence plan to the auto-tramming system over a communication link, wherein the auto-tramming system includes a path planning module to automatically determine an optimized travel trajectory based on the travelling sequence plan and a navigation system to determine a localization of the autonomous vehicle and wherein the auto tramming system is operated in at least one of an operator-aided mode or a fully autonomous mode; and operating the autonomous vehicle based on the optimized travel trajectory and the localization.

29. A computer-implemented method to operate a drill comprising:

deriving a potentially optimal drilling sequence to be used to operate the drill to drill blast holes at locations in a drilling pattern using a Sequential Ordering Problem (SOP) solving procedure, wherein the potentially optimal drilling sequence is based on data reflecting an initial version of a cost table of costs of travel by the drill between one or more drill hole locations in a drilling pattern, and wherein the SOP solving procedure derives the potentially optimal drilling sequence by processing the data reflecting the initial version of the cost table and the drill hole locations in the drilling pattern using at least one of a genetic algorithm, a Swarm Intelligence algorithm, or an Ant Colony Optimisation algorithm;

deriving a plan of drill motions to be executed by the drill through the potentially optimal drilling sequence and a revised version of the cost table using a motion planning procedure, wherein the plan of drill motion is based on data reflecting the potentially optimal drilling sequence, wherein the revised version of the cost table is based on data reflecting the plan of drill motions and the initial version of the cost table, and wherein the motion planning procedure derives the plan of drill motions and the revised version of the cost table by processing the data reflecting the potentially optimal drilling sequence and the initial version of the cost table using at least one of a Probabilistic Roadmap motion planning algorithm or a Rapidly-exploring Randomized Tree algorithm;

determining a hole-drilling sequence plan based on successively repeating the SOP solving and motion planning procedures with each successive potentially optimal drilling sequence being based on each successive revised version of the cost table until a predetermined termination criterion is met, wherein the SOP solving and motion planning procedures are executed in one or more processors of a computer system and wherein the computer system is in communication with the mobile autonomous drill via an auto-tramming system; and after the predetermined criterion is met, transmitting the hole-drilling sequence plan to the auto-tramming system over a communication link, wherein the auto-tramming system includes a path planning module to automatically determine an optimized drill trajectory based on the hole drilling sequence plan and a navigation system to determine a localization of the mobile autonomous drill and wherein the auto tramming system is operated in at least one of an operator-aided mode or a fully autonomous mode; and operating the drill based on the optimized drill trajectory and the localization.

* * * * *